BELT TRACKING SYSTEM

Original Filed May 24, 1968 6 Sheets-Sheet 1

INVENTORS
HUGH L. JONES
DAVID R. STOKES
BY
B. A. Chiara
Isaac P. Schwartz
ATTORNEYS

BELT TRACKING SYSTEM

Original Filed May 24, 1968 6 Sheets-Sheet 2

INVENTORS
HUGH L. JONES
DAVID R. STOKES
BY
ATTORNEYS

BELT TRACKING SYSTEM

Original Filed May 24, 1968 6 Sheets-Sheet 3

INVENTORS
HUGH L. JONES
DAVID R. STOKES
BY
D. A. Chiama
William P. Schuder
ATTORNEYS INVENTORS
HUGH L. JONES
DAVID R. STOKES
BY B. A. Chiarna
James P. Schenck
ATTORNEYS

BELT TRACKING SYSTEM

Original Filed May 24, 1968 6 Sheets-Sheet 5

INVENTORS
HUGH L. JONES
DAVID R. STOKES
BY
ATTORNEYS

INVENTORS
HUGH L. JONES
DAVID R. STOKES
BY
B. A. Chiara
Henry P. Schuder
ATTORNEYS United States Patent Office Re. 27,313
Reissued Mar. 21, 1972

27,313
BELT TRACKING SYSTEM

Hugh L. Jones, Rochester, and David R. Stokes, Webster, N.Y., assignors to Xerox Corporation, Rochester, N.Y.

Original No. 3,500,694, dated Mar. 17, 1970, Ser. No. 826,740, Mar. 27, 1969, which is a continuation of Ser. No. 731,755, May 24, 1968. Application for reissue Aug. 3, 1970, Ser. No. 60,396
Int. Cl. F16h *7/18*
U.S. Cl. 74—241 7 Claims

Matter enclosed in heavy brackets [ ] appears in the original patent but forms no part of this reissue specification; matter printed in italics indicates the additions made by reissue.

ABSTRACT OF THE DISCLOSURE

A belt tracking arrangement for use with a belt supporting roller wherein the shaft for the roller is mounted for short pivotal movement about an axis normal to its axis and which lies in a plane that bisects the angle of the belt runs on either side of the roller.

This is a continuation of application Ser. No. 731,755, filed May 24, 1968, now abandoned.

This invention relates to belt transport apparatus and particularly, to improvements in a belt tracking system for a photoconductor plate in the form of an endless belt. The tracking system arranged in accordance with the present invention is particularly adapted for use with selenium belts in automatic copiers/reproducers that are constructed for high speed operation and capable of having their sequence timing varied thereby permitting variable speeds of output.

As is well known in recent years, the steadily increasing size of various industries has required an enormous increase in the amount of paper work that must be accomplished, maintained and made available for wide interplant circulation. In the present day commercial automatic copiers/reproduction machines, which are adapted to produce copies of between 5 and 60 8 x 11" sheets of copy per minute, the photoreceptor device is in the form of a drum which rotates in timed unison relative to a plurality of processing stations.

The limiting feature in these present day machines is the use of the xerographic drum which seriously limits the positioning and action of each of the processing devices and, in particular, the requirement of presenting a flowing image upon the xerographic drum as a document is being scanned.

The mechanism which accomplishes the scan of a fixed document in the drum type copier/duplicator generally involves a slidable carriage for supporting illumination lamps in addition to drive mechanisms, levers, pulleys, switches, etc. for accomplishing scanning of the document. As the demands for faster copying or duplicating has come about, these conventional machines generally have been modified in their respective drive systems and electrical circuits in order to accomplish a faster scan for the scanning mechanisms already in the machine. The result of these modifications is to propel the structures that go to make up the scanning mechanisms at very great speeds and, as will be apparent, will place great undue burdens upon the structural supports of the machine and the scanning mechanism.

As a solution for overcoming the multitude of the advantages for high speed copying, the latest machine concept for copiers utilizes flash exposure of a document and the arrangement of a moving photoconductor material in the form of a belt held in a flat condition at the instant of exposure. However, the use of photoconductor belts require extreme care since these belts are very delicate, are easily damaged and the movement thereof through processing stations in a reproduction machine must be accomplished with high precision and with as little irregular movement as possible.

It is therefore the principal object of this invention to improve copiers/reproduction machines of the type having a belt form of photoreceptor by maintaining belt travel in accurate alignment with a pre-determined path of movement.

Another object of this invention is to improve the ability of belt handling apparatus for controlling precise movement of the belt during continuous movement thereof.

Another object of this invention is to improve belt tracking mechanisms for an endless belt by producing corrective tracking which will produce minimum strain upon the belt.

These and other objects of this invention are obtained by means of a belt tracking arrangement applied to one of the rollers in an endless belt conveying system wherein the roller has its entry and exit runs at an angle less than 180°. The roller is mounted for rocking movement on an axis within the plane of the bisector of the angle formed by the two runs. The roller shaft is mounted at its ends on support arms which are adapted to pivot in unison, in opposite directions and on an axis which is in the bisector plane and is parallel to the roller shaft.

For a better understanding of the invention as well as other objects and further features thereof, reference is had to the following detailed description of the invention to be read in conjunction with the accompanying drawings, wherein.

Figure 1:
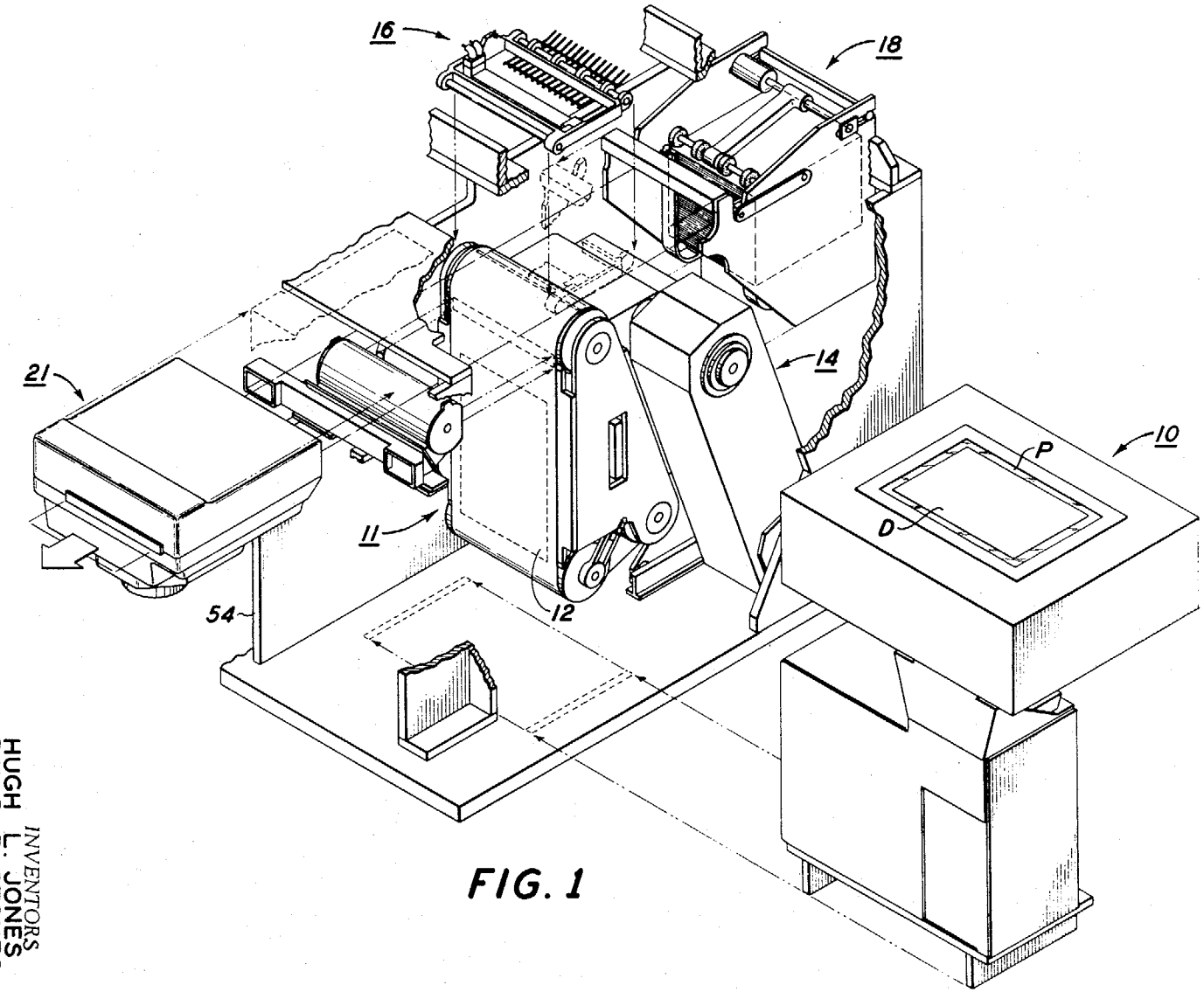
FIG. 1 is an exploded right-hand perspective view of a reproduction machine incorporating the present invention therein with the processing components separated to better illustrate the invention.
Figure 2:
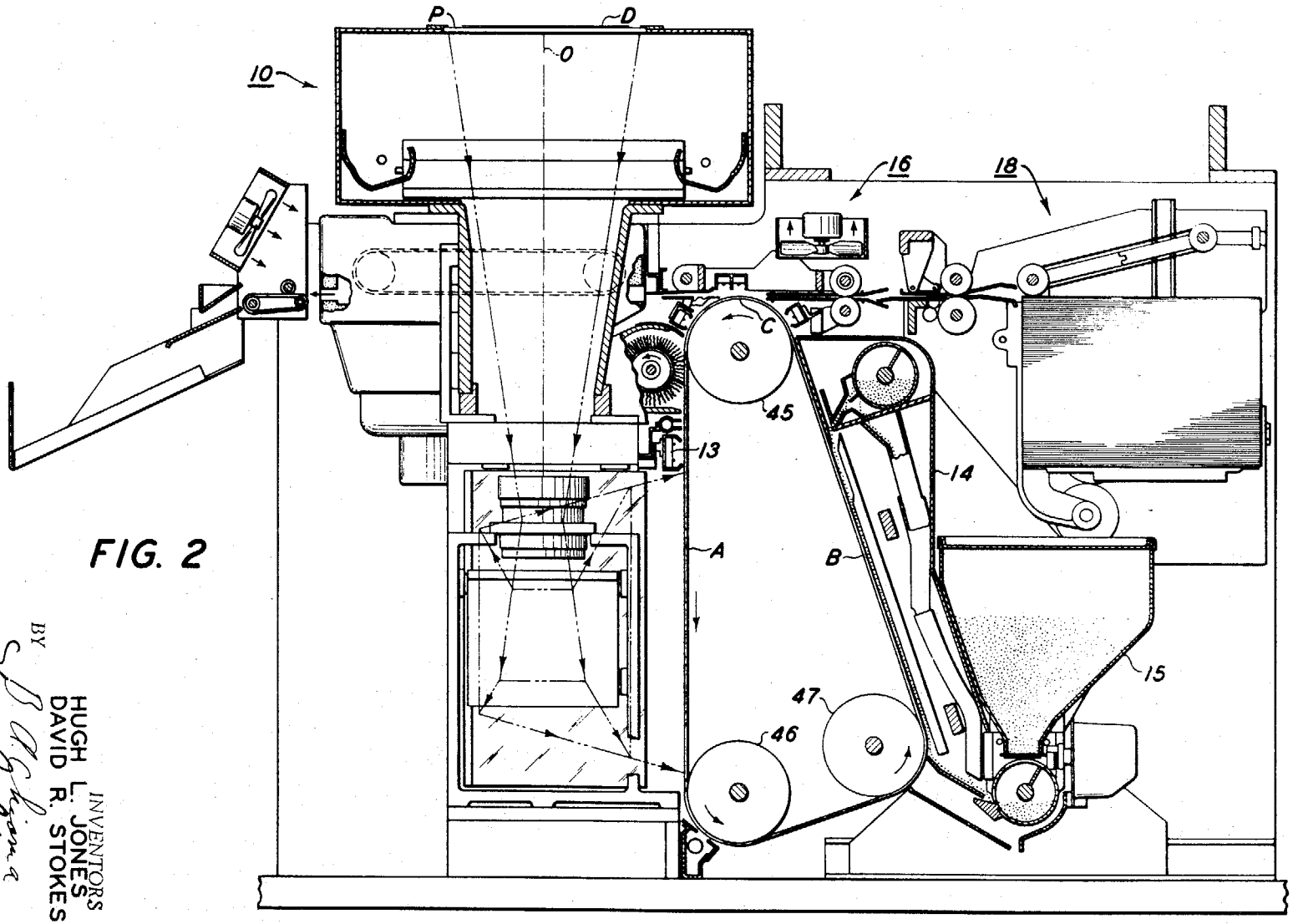
FIG. 2 is a schematic sectional view of the reproduction machine showing the various xerographic processing stations.

For a general understanding of the illustrated copier/repreduction machine, in which the invention may be incorporated, reference is had to FIGS. 1 and 2 in which the various system components for the machine are schematically illustrated. As in all electrostatic systems such as xerographic machine of the type illustrated, a light image of a document to be reproduced is projected onto the sensitized surface of a xerographic plate to form an electrostatic latent image thereon. Thereafter, the latent image is developed with an oppositely charged developing material to form a xerographic powder image, corresponding to the latent image on the plate surface. The powder image is then electrostatically transferred to a support surface to which it may be fused by a fusing device whereby the powder image is caused permanently to adhere to the support surface.

In the illustrated machine, an original to be copied is placed upon a transparent support platen P fixedly arranged in an illumination assembly generally indicated by the reference numeral 10, arranged at the left end of the machine. While upon the platen, an illumination system, to be described herein, flashes light rays upon the original thereby producing image rays corresponding to the informational areas on the original. The image rays are projected by means of an optical system for exposing the photosensitive surface of a xerographic plate in the form of a flexible photoconductive belt arranged on a belt assembly generally indicated by the reference numeral 11.

The photoconductive belt assembly 11 is slidably mounted upon a support bracket secured to the frame of the machine and is adapted to drive a selenium belt 12 in the direction of the arrow as shown in FIG. 2 at a constant rate. During this movement of the belt, the reflected light image of an original on the platen is flashed upon the xerographic surface of the belt, at such a speed measured in microseconds, that the relative motion of the light rays comprising the light image and the belt surface is minimal. The belt surface that intercepts the light rays comprises a layer of photoconductive material such as selenium on a conductive backing that is sensitized prior to expose by means of a charging corona generator device indicated at 13.

The flash exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes through a developing station B in which there is positioned a developer assembly generally indicated by the reference numeral 14 and where the belt is maintained in a flat condition. The developer assembly 14 comprises a vertical conveying mechanism which carries developing material to the upper part of the belt assembly 11 whereat the material is dispensed and directed to cascade down over the upwardly moving inclined selenium belt 12 in order to provide development of the electrostatic image.

As the developing material is cascaded over the xerographic plate, toner particles in the development material are deposited on the belt surface to form powder images. As toner powder images are formed, additional toner particles are supplied to the developing material in proportion to the amount of toner deposited on the belt during xerographic processing. For this purpose, a toner dispenser generally indicated by reference numeral 15 is used to accurately meter toner to the developer material in the developer assembly 14.

The developed electrostatic image is transported by the belt to a transfer station C whereat a sheet of copy paper is moved at a speed in synchronism with the moving belt in order to accomplish transfer of the developed image. There is provided at this station a sheet transport mechanism generally indicated at 16 adapted to transport sheets of paper from a paper handling mechanism generally indicated by the reference numeral 18 to the developed image on the belt at the station B.

After the sheet is stripped from the belt 12, it is conveyed into a fuser assembly generally indicated by the reference numeral 21 wherein the developed and transferred xerographic powder image on the sheet material is permanently affixed thereto. After fusing, the finished copy is discharged from the apparatus at a suitable point for collection externally of the apparatus.

Suitable drive means may be arranged to drive the selenium belt 12 in conjunction with timed flash exposure of an original to be copied, to effect conveying and cascade of toner material, to separate and feed sheets of paper and to transport the same across the transfer station C and to convey the sheet of paper through the fuser assembly in timed sequence to produce copies of the original.

It is believed that the foregoing description is sufficient for the purposes of this application to show the general operation of an electrostatic copier using an illumination system constructed in accordance with the invention.

Figure 3:
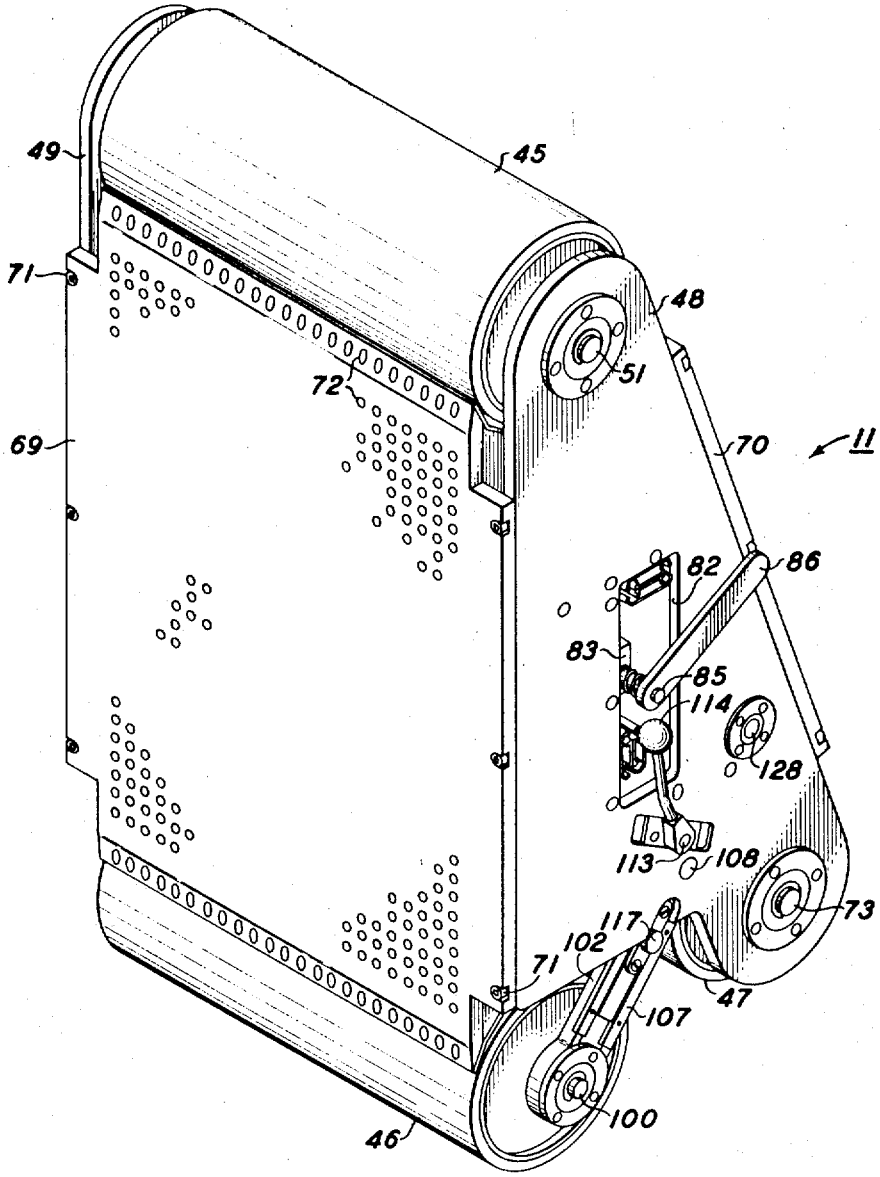
FIG. 3 is a perspective view of the photo-conductive belt assembly utilized in the machine.

The selenium belt comprises a photoconductive layer of selenium which is the light receiving surface and imaging medium for the apparatus, on a conductive backing. The belt is journaled for continuous movement upon three rollers 45, 46 and 47 located with parallel axes at approximately the apex of a triangle. During exposure of the belt 12, the portion thereof being exposed is that part of the belt run between the upper roller 45 and the lower roller 46. As shown in FIG. 3, the photoconductive belt assembly 11 is illustrated with the selenium belt removed in order to illustrate the assembly mechanisms located adjacent the belt.

The upper and lower pulleys 45 and 47 are journaled in two side plates 48 and 49, each having the general configuration of a triangle. The upper apex of the side plate 48 is formed with an opening for containing and supporting a bearing 50 which rotatably supports one end of the shaft 51 for the roller 45. At the other end, the shaft 51 is journaled in a bearing 52 supported at the upper apex for the side plate 49 in the same manner; however, the shaft extends beyond the side plate and through an opening 53 formed concentrically with the shaft in a main support plate 54 for the reproduction apparatus. A shaft extension 55 is formed on this end of the shaft and extends through the opening 53.

Figure 6:
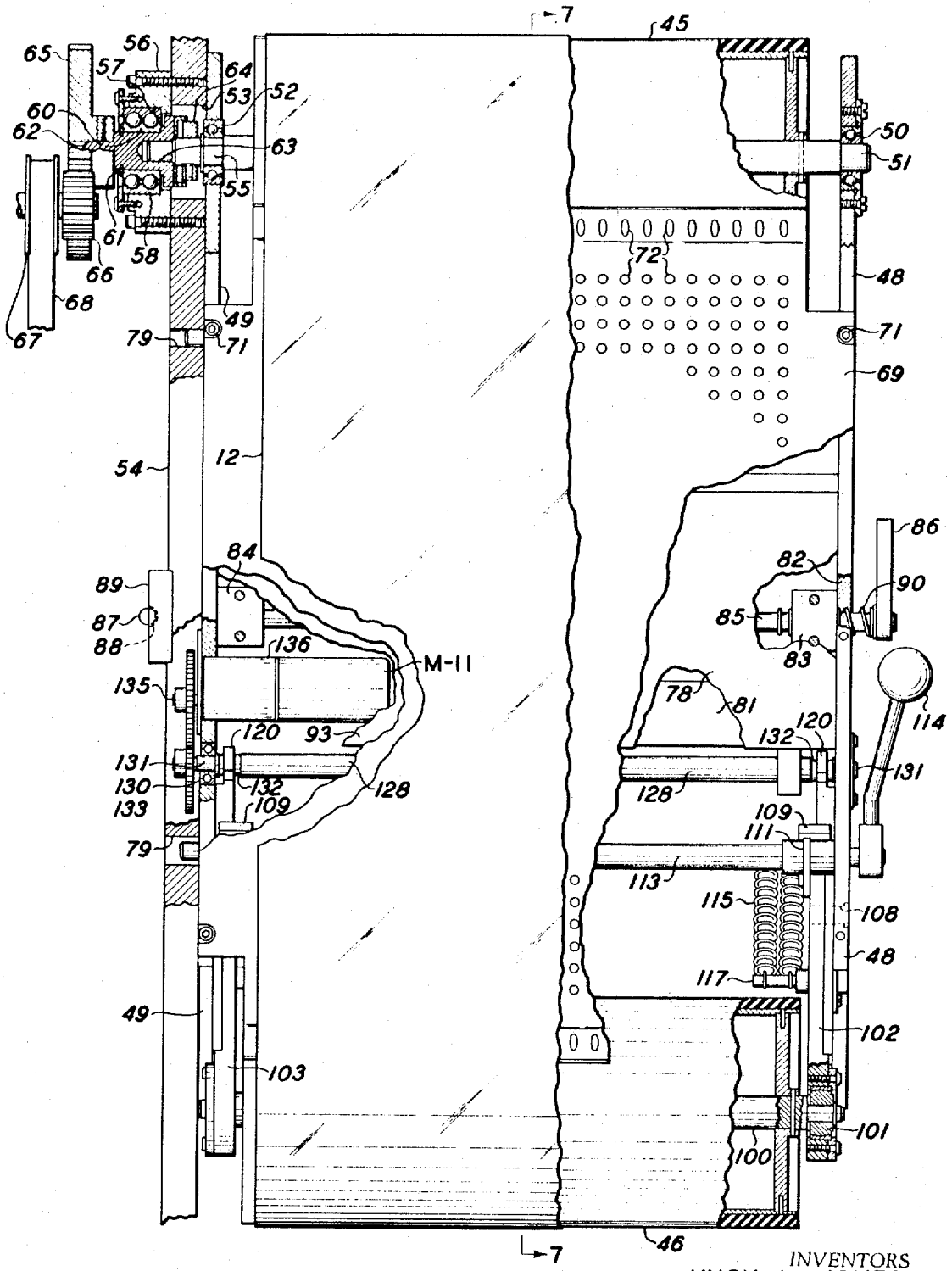
FIG. 6 is an elevational view of the belt assembly with the belt mounted thereon partly in section to show various internal parts.

The purpose for the extension 55 of the shaft 51 is to support a drive mechanism for rotating the roller 45 when the belt assembly 11 is in operating position, that is, when the side plate 49 is positioned against the main frame plate 54, and still permit the easy removal of the belt assembly 11 from the machine frame. To this end the main frame plate 54 is provided with a quick disconnect mechanism for releasably receiving the extension 55 and to become drivingly engaged with the extension when the assembly 11 is in operating position. As shown in FIG. 6, the opening 53 in the frame plate 54 is covered on one side, the side removed from the roller 45, by a support ring 56 suitably secured by bolts to remote side of the plate 54. The ring 56 is formed with an opening 57 concentric with the opening 53 and the shaft 51 when in operating position. Within the opening 57 is retained a bearing 58 having an inner race 60 secured by a lock ring 61 to a drive member 62 rotatably retained by the bearing 58 upon the plate 54. The drive member 62 is formed with a concentrically positioned recess 63 into which is inserted the extreme end of the extension 55. This end of the extension has a snug fit within the opening 63 and serves to precisely locate the axis of the shaft 51 relative to the support frame plate 54 thereby insuring accurate driving of the selenium belt 12.

The driving connection between the shaft 51 and the drive member 62 is in the form of a one way clutch 64 drivingly connected between the extension 55 and the member 62. The clutch 64 is adapted to become engaged when the assembly 11 is in operating position in order to permit rotation of the roller 45 by rotation of the drive member 62. When the belt assembly 11 is slightly removed or pulled away from the frame plate 54, the clutch 64 and the extension 55 are pulled out of the recess 63 in the drive member 62 in order to disengage the connection therebetween.

The outer extremity of the drive member 62 is adapted to support a drive gear 65 which meshes with a smaller gear 66 secured to a pulley 67 drivingly connected by way of a timing belt 68 to a drive system to be described hereinafter.

The side plates 48 and 49 are maintained in parallel planes and rigidly supported in spaced relation for supporting the rollers 45, 46 and 47 and all of the other structures that comprise the belt assembly 11 by an internal T-member to be described below. The side plates 48, 49 also suppot a flat front plate 69 and a rear flat plate 70 by suitable means such as screws 71. Each of the plates 69 and 70 are formed with a plurality of apertures 72 which extend through the respective plates. As will be described in detail hereinafter, the plates 69 and 70 serve as vacuum holddown plates for supporting the selenium belt 12 flat against the plates during movement thereof on the assembly 11. The apertures 72 are in communication with a plenum chamber which, in turn, is connected by suitable ducts to a vacuum chamber for drawing air inwardly through the apertures 72 and thereby holding by vacuum the adjacent runs of the belt 12.

The lower roller 47 is similiarly mounted upon the side plates 48, 49 as is the left-hand end of the shaft 51 for the roller 45. The shaft 73 for the roller 47 may be suitably supported in ball bearings similar to bearing 50 supported in the side plates 48, 49.

As previously stated, the selenium belt assembly 11 is slidably supported on the machine frame plate 54. To this end, the frame plate 54 has extending horizontally and perpendicular thereto a support arm 75 having a cross-section shaped as the letter T.

Secured to the upper cross bar of the support arm 75 is the lower race 76 of a slide suspension arm which also includes an upper race 77 secured to the upper leg of a T shaped channel member 78 secured between and supporting the side plates 48, 49 of the belt assembly 11. The channel member 78 is approximately positioned within the center space of the belt assembly and also has secured on one side thereof a race 80 of another slide suspension arm which has its other race 81 secured to the adjacent lower section of the support arm 75. Upon viewing FIGURE 7 it will be apparent that a belt assembly 11 is adapted to be moved toward and away from the frame plate 54 and to be supported thereon for sliding movement by the support arm 75, the sliding characteristic being supplied by the slide suspension arms comprising the races 76, 77 and 80, 81. When mounted on the arm 75 in cantilever fashion, all of the mounting means for the belt assembly are positioned within the confines of the assembly as defined by the axes of the rollers 45, 46, 47. This arrangement allows access to and clearance for the belt permitting removal or installation of the same without endangering its structure.

The T-members 75, 78 together with the slide suspension arms connected therebetween and the shaft extension 55 and the drive member 62, allow the belt assembly 11 to be removed and positioned for support upon the fixed support plate 54 without disrupting or requiring a drive connection and, to insure safe positioning of the belt and the assembly. Guide slots 79 formed in the plate 54 receive locating pins secured to the plate 49 for precisely locating the assembly 11 once it has been moved into operating position.

Each of the side plates 48, 49 is formed with axially aligned openings 82 in order to accommodate the support arm 75 during mounting or removal of the assembly 11. These openings, only one of which is shown, also serve to permit the extension therethrough of a locking mechanism for releasably holding the assembly 11 upon the plate 54 when the assembly has been moved thereto.

Figure 4:
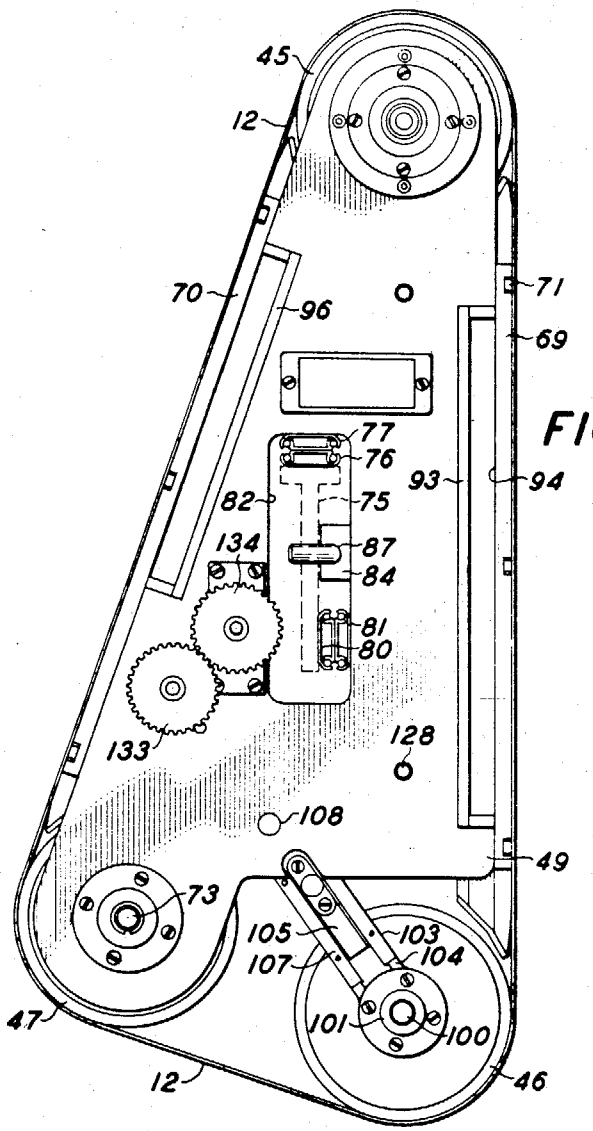
FIG. 4 is an elevational view of the belt assembly as seen from the rear of the machine.

This locking mechanism includes a pair of blocks 83, 84 secured within the chamber defined by the plates 48, 49 and one to each of these plates. A shaft 85 is slidably received in the blocks 83, 84 and extends through the opening 82 formed in the plate 48 a short distance to accommodate a handle 86 at the end thereof. The other end of the shaft 85 extends through the other opening 82 formed in the side plate 49 and extends beyond an opening formed in the frame plate 54 in line with the opening 82. This end of the shaft 85 terminates in a bent portion 87 (see FIG. 4) which is adapted to be moved to assume different radial directions upon rotation of the shaft 85 by the handle 86. The bent portion 87 is adapted to be received in a depression 88 formed in a circular lock member 89 secured upon the outer surface of the frame plate 54.

Normally, the shaft 85 is urged outwardly or to the right as viewed in FIG. 6 by a spring 90 held in compression between the handle 86 and one side of the block 83. When the assembly 11 is removed from the frame plate 54, the spring 90 will cause the bent portion 87 to abut against the block 84.

In order to lock the assembly 11 against the plate 54 and assuming that the assembly 11 is properly oriented upon the plate, the handle is pushed toward the adjacent side plate 48 in order to drive the bent portion 87 through the opening 82 in the plate 49 and the adjacent opening in the frame plate 54. Rotation of the handle while so depressed will rotate the bent portion 87 in position to be in alignment with the depression 88 formed in the lock member 89. Upon release of the handle 86, the spring 90 will force the shaft 85 outwardly thereby causing the bent portion 87 to assume a locked position within the sides of the depression 88. In this manner, the assembly 11 remains rigidly locked in proper position and alignment upon the frame plate 54.

Figure 7:
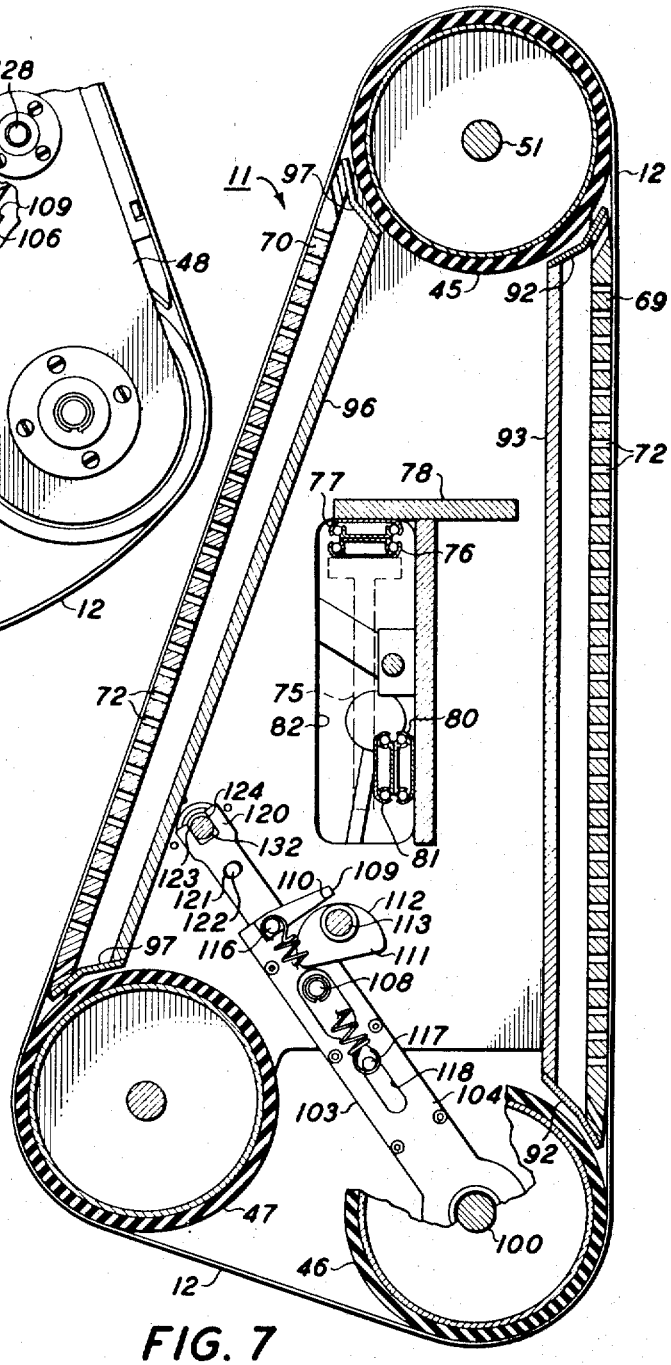
FIG. 7 is a sectional view taken along the line 7—7 in FIG. 6.

As previously stated, the apertures 72 formed in the vacuum plates 69 and 70 are in communication with plenum chambers which, in turn, are connected to a vacuum manifold which is suitably connected to an evacuation system, such as a blower and the like, in order to produce a slight vacuum within the plenum chambers. As shown in FIG. 7, the front or exposure side of the belt assembly 11 is connected by means of end strips 92 to a rear base 93 mounted parallel to but spaced slightly from the front vacuum plate 69. The flat chamber formed between the plates 69 and 93 and the end strips 92 define a vacuum plenum having an outlet slot 94 (see FIG. 4) which is arranged, when the assembly 11 is in locked position upon the plate 54, to be in communication with an opening formed in the plate 54. The edges of the slot 94 are gasketed so that when in abutment with the adjacent surface of the frame plate 54 and in alignment with a slot opening formed therein of a size and shape as the opening 94, there will be a minimal amount of leakage of air through these abutting surfaces.

The opening 94 may be suitably connected to a hose or manifold to a suitable blower which would in operation evacuate air from the plenum chamber and cause the flow of air inwardly through the openings 72. This vacuum condition will cause the selenium belt 12 to be drawn against the plate 69 during movement of the belt during processing by the machine. Since the plate 69 lies in alignment with the exposure station for the selenium belt, it is imperative that the selenium belt, as it moves across the station, be as flat as possible so that light rays impinging upon the selenium belt at this area will be in focus at all points.

Similarly, the rear vacuum plate 70 combines with a parallel spaced base plate 96 and end strips 97 to form a second plenum chamber which is also connected to a suitable opening in the base plate 54 and connected to a blower or vacuum producing apparatus. The rear vacuum plate 70 and its related plenum structure is adapted to hold the selenium belt in a flat plane on this side of the belt assembly, which side is adjacent, as will be described hereinafter, to a development apparatus which requires that the selenium belt be or remain in a flat condition.

As previously stated, the selenium belt rollers 45 and 47 are mounted for rotation upon the side plates 48, 49, being held against any other movement relative to the side plates by suitable mounting bearings. In order to permit he mounting and dismounting of a selenium belt 12 upon he belt assembly 11, the assembly is provided with an ırrangement for moving the third roller 46 inwardly in ›rder to form a slack in the belt 12 for permitting its renoval by sliding axially of the rollers. As part of this ar-'angement, the roller 46 is rigidly secured upon a shaft 100, the ends of which are each mounted within a self-ıligning bearing element 101 adapted to be secured to :ach support arm 102, 103.

Each of the support arms 102, 103 is arranged for ongitudinal movement for one operative function there-'or and, for limited rocking or slight pivotal movement 'or another operative function. To this end, each of the ıupport arms comprises a first slide member 104 to which he bearing element 101 is secured for supporting the 'oller 46 upon the belt assembly and a second slide mem-›er 105 slidably mounted relative to the first member. n order to accomplish sliding movement of one slide nember relative to the other, the member 104 is formed vith an elongated depression 106 running along the lon-;itudinal axis thereof and, within the depression, the slide nember 105 conforms and is held against removal there-'rom by suitable lock strips 107 mounted in parallel to he adjacent edges of the member 104 in overlapping rela-ionship relative to adjacent edges of the member 105. When mounted together, the members resemble a slide ule device which may be elongated by extending the nembers.

The support arms 102, 103 are supported by pivot pins 108, each securing to one of the arms to the lower portion ›f the side plates 48, 49. Each pin 108 is rotatably fas-ened to the slide member 105 and is slidably related to he first member 104. This arrangement has the effect of ›reventing axial movement of the second slide member 105 while allowing sliding movement of the first member 104 relative to the second member.

Figure 8:
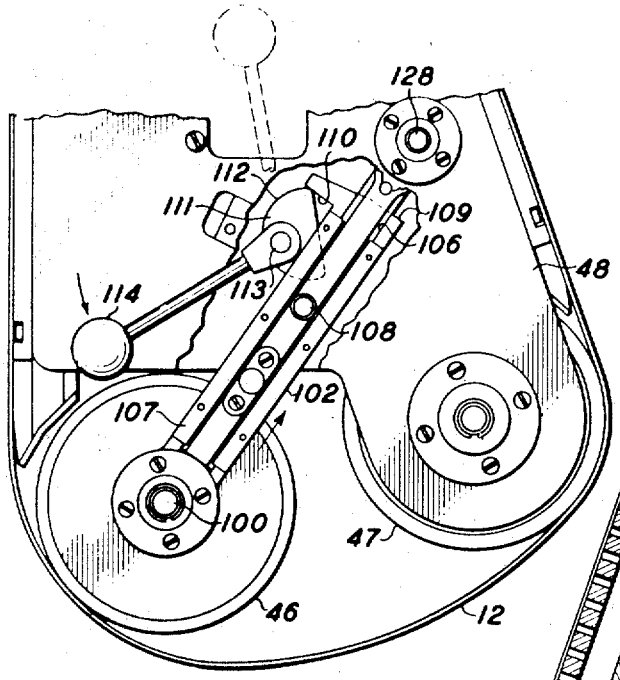
FIG. 8 is a partial view of the lower section as seen from the front of the developer assembly showing the selenium belt in a relaxed condition.

Manually operated control means are provided for ›roducing simultaneous sliding movement of each first nember relative to the respective second member in order o move the roller 46 inwardly relative to the belt assem-›ly to permit the removal or installation of the selenium ›elt 12. The end of the first member 104 remote from he end thereof which supports the roller shaft 100 is ›rovided with a cam follower 109. As shown in FIG. 8, he follower extends in a direction normal to the longitu-linal axis of the support arm 102 and has a lateral ex-ending cam surface 110 adapted to cooperate with a cam 111 formed as a semi-circular disc and being mounted :ccentrically relative to the semi-circular cam surface 112 hereon. Each of the cams 111 is secured for rotation ıpon a shaft 113 which in turn, is mounted for rotation ›n the side plate 48, 49 of the belt assembly. In being ecured to the shaft 113, the cam surface 112 for each ›f the cam plates 111 will be moved in unison when the haft is rotated and, upon rotation, will simultaneously ›ngage the camming surface 110 of each of the cam fol-owers 109.

Rotation is imparted to the shaft 113 by way of a man-ıally actuable handle 114 secured to one end of the shaft :xtending through the side plate 48. As shown in full lines n FIG. 5, the handle 114 is positioned such that the cam, ›lates 110 as shown in FIG. 7, is against the shortest cam-ning position for the cam surfaces 110 in fact, there is a light spacing between the surface 110 and the follower 109, thereby allowing the slide member 104 to be extended ıutwardly to its maximum, belt supporting and tension-ng limit. When the handle 114 is moved to the dotted ›osition in FIG. 5, which corresponds to its full line posi-ion in FIG. 8, the cam plates 111, being moved thereby, vill contact the surface 110 at its high points and drive he support member 104 along its longitudinal axis to the ›osition of the cam follower 109 shown in full lines in FIG. 8. With each slide members 104 being thereby noved, the roller 46 is moved inwardly to the position hown in FIG. 8. In this position of the roller, an operator may remove the selenium belt 12, which will be in a loose condition from the selenium belt assembly 11.

Normally the support slide member 104 is held in its outermost maximum belt tensioning limit by means of a pair of relatively stiff springs 115 each having one end secured to a post 116 secured to the member 104 at cam follower 109 and their other ends secured to a post 117 secured to the support member 105. The post 117 extends through a slot 118 formed in the support member 104 being arranged to permit extension of the post 117 therethrough and movement of support member 104 relative to the post 117. Normally the springs 115 are held extended between the post 116, 117 thereby normally maintaining the slide members 104, 105 toward their extended position.

This arrangement places a spring bias upon the supporting shaft 100 for the roller 46 toward its fully extended position during operation of the belt assembly. The springs 115, therefore, also serve to place appreciable tension upon the selinium belt 12 during movement thereof on the belt assembly. In the event that the photoconductive belt is to be removed and replaced by another belt, the operator manipulates the handle 114 from the position shown in dotted lines to the position shown in full lines in FIG. 8 thereby actuating the support member 104 inwardly against the bias provided by the springs 115. This movement is accomplished rather smoothly with the shaft 100 being moved from its outermost operative position to its most inwardmost position that is parallel to the operative position.

Each of the support arms 102, 103 is adapted to be rotated about its respective pivot pin 108 and in opposite directions in order to rock the shaft 100 in a plane normal to the plane defined by axes of the support arms. This rocking movement is provided in order to permit tracking of the selenium belt during its continuous movement around its three support rollers. This tracking capability is provided in order to maintain the belt in a precise predetermined position for all xerographic stations surrounding the belt assembly 11 when in operation. The tracking is accomplished by mechanism which are adapted to slightly pivot each of the arms 102, 103 in opposite direction about their respective pivot pins 108, as previously stated.

As shown in FIG. 7, the end of each slide member 105 remote from the end adjacent the shaft 100 is formed as a yoke element 120 that is in alignment with the longitudinal axis of the slide member. This end of each support arm is also formed with a slot 121 having its longitudinal axis normal to the longitudinal axis of the member 105. Each slot is adapted to accommodate a screw 122 having its threaded portion secured into the inner surface of the plates 48, 49 of the belt assembly 11. Portions of the screws 109 that are cooperable with the sides of the slots 121 are free of threads and serve to maintain the arms 102, 103 against the side plates for the selenium belt assembly. The inner edges of the yoke element 120 are formed with camming surfaces 123 and 124 held in abutment against a cam shaft 128 which extends through the belt assembly 11 and is mounted in suitable bearings 130 secured to the side plates 48, 49.

As shown in FIGS. 6 and 7, the shaft 128 has its on-axis end portions 131 mounted in the bearings 130 and portions 132 eccentric relative to the main portion of the shaft. Each eccentric portion 132 is adapted to engage one or the other of the camming surfaces 123, 124. Upon rotation of the shaft 128 in either direction, each eccentric portion is adapted to drive the corresponding yoke member 120 laterally in opposite directions in order to pivot the corresponding support arms 102, 103 about their respective pivots in opposite rotational directions thereby effecting opposite movements to each end of the shaft 100.

In order to provide movement of both ends of the shaft 100 in opposite directions thereby effecting a greater available movement to the roller 46, the eccentricity of the cam portions 132 are in opposite directions. Upon rotation of the shaft 128, the axis of the main portion thereof will remain fixed and will move the cam 132 in the same direction to effect corresponding pressures upon one of the camming surfaces 123, 124 in opposite directions, that is, the camming surface 123 for one of the support arms 102, 103 will be moved in one direction, and the camming surface 124 of the other arm will be moved in the opposite direction. The effect of this opposite directional movement of the support arms 102, 103 will produce rocking movement of the shaft 100, and consequently the roller 46. The spherical bearings upon which the shaft 100 is mounted will permit this slight relative rocking movement of each end of the shaft relative to its fixed mounting arrangement in the form of the members 104.

Figure 5:
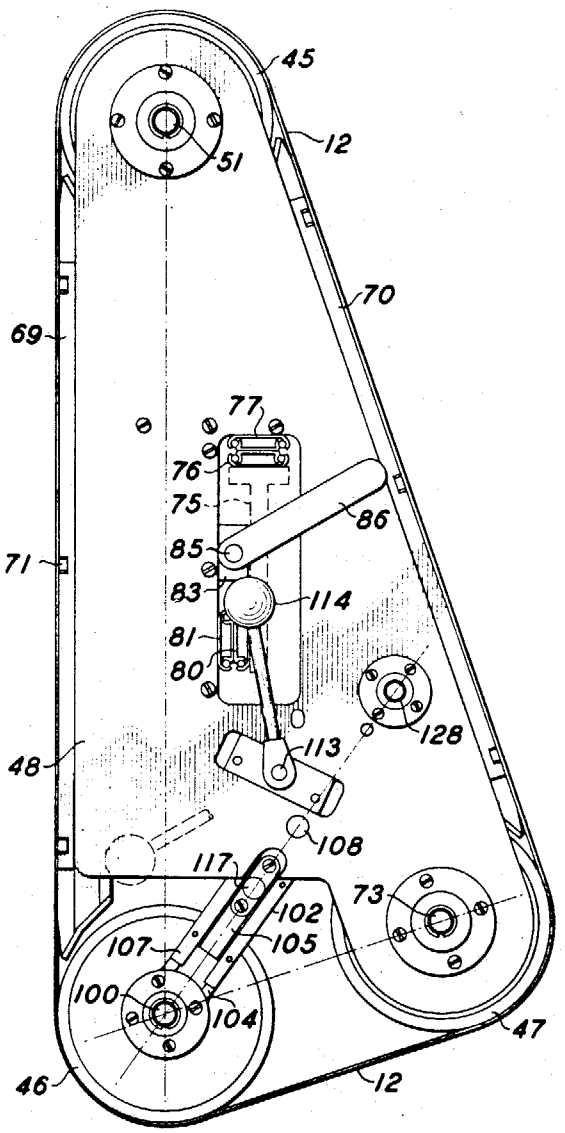
FIG. 5 is an elevational view of the other side of the belt assembly as seen from the front of the machine.

As shown in FIG. 5, the axes of the shaft 100, the pins 108 and the shaft 128 for the support arm 102 are in alignment and, for both arms 102, 103 these axes lie in a common plane. This plane is in coincidence with the bisector of the angle formed between the planes of the belt runs on either side of the roller or, in other words between the plane defined by the axes of the shafts 100 and 73 and the plane defined by the axes of the shaft 100 and the shaft 51. With the support arms 102, 103 being equally pivotable in either direction, the roller 46 during tracking operation, will rock about an axis lying on the bisector plane and positioned intermediate the ends of the roller. For tracking then, such skew action of hte roller will effect an angular relationship of the roller relative to the direction movement of the belt thereby causing the same to steer or follow the roller surface and be displaced laterally in order to return the belt back to a centered position rather than exerting pressure on the belt adjacent one edge portion thereof. In this manner, pressure is applied equally to all portions of the belt affected during tracking action thereby minimizing the tendency of the tracking arrangement to adversely affect belt structure by exerting undue pressures of the belt structure adjacent one edge or the portion between the midline of the belt and one edge. With the axis of pivoting of the roller 46 lying on the bisecting plane for the planes of the selenium belt runs, the deflection of the ends of the roller occurs in opposite direction to provide maximum belt correction with minimum roller skewing. Preferably the roller 46 is covered with a rubber coating which will prevent slippage of the belt as it steers during tracking. During rocking of the shaft 100, both edges of the belt are affected equally and, as the skewing increases during tracking action, any tendency of the belt to lessen in circumference will cause movement of the roller 46 inwardly against the tension of the springs 115 which serve as shock absorbers for tracking action.

In the event that the selenium belt 12 is removed and a new one applied to the belt assembly which has a slightly larger or smaller circumference, the springs 115 will always maintain the same pressure of the roller 46 upon the belt thereby insuring the same tension upon a belt regardless of its circumferential size. The arrangement also eliminates any two directional forces being applied to the belt which could have a destructive effect upon the relatively thin film of the photoconductive material on the belt. In addition, with the axis of the roller 46, lying on the bisecting plane of the angle between the adjacent belt runs during rocking movement of the roller 46, there is a minimum of deflection, caused by skewing of the belt, along the exposure belt run between the rollers 45, 46 thereby minimizing the effect of belt skewing upon the imaging abilities on this run during an exposure of an original.

Drive means are provided in the belt assembly 11 in order to impart controlled instantaneous rotation of the shaft 128 in either direction depending upon the slipping of the belt axially relative to the shafts of the rollers 45, 46, 47 in either direction. The shaft 128 has its end portion 131 extending through the side plate 49 and terminating in a gear 133 secured thereto. The gear 133 is in mesh with a second gear 134 secured to a shaft 135 for a reversible motor M–11 and gear reduction arrangement 136. Energization of the motor M–11 will impart rotation to the gears 133, 134 for rotating the shaft 128 in either direction depending which direction the belt 12 slips relative to supporting rollers.

Energization of the motor is accomplished by means of a sensing device comprising a potentiometer POT (not shown) having a sensing finger positioned adjacent an edge of the belt 12. In the event the belt strays, the potentiometer and its associated circuitry will produce a signal to cause energization of the motor M–11 and rotation thereof in a direction to cause the roller 46 to rock into a position to force the belt back toward the direction opposite the slipping direction.

What is claimed is:

1. A belt tracking apparatus for use with a belt assembly having a plurality of rollers with supporting shafts for guiding and supporting an endless belt for movement therearound and with the axes of the shafts substantially in parallel comprising a support arm pivotally connected to each end of the shaft of one of the rollers, means for pivotally mounting said support arms on a common axis substantially parallel to the axis of said shaft, said shaft and said pivotal axis defining a plane arranged to bisect the angle between the planes of the belt runs on either side of said roller, and control means for pivotally actuating said support arms in opposite directions in response to deviation of the belt from a pre-arranged belt path whereby said roller pivoted about an axis in said bisector plane and normal to the axis of said shaft.

2. The apparatus of claim 1 wherein each support arm comprises a first slide member connected to the corresponding end of said shaft and a second slide member pivotally mounted on said common axis and slidably supporting said first member.

3. The apparatus of claim 1 including means operatively connected to said support arms and said roller shaft for normally exerting a force on the roller tending to enlarge the belt thereby producing tension on the belt.

4. The apparatus of claim 1 wherein said control means includes a drive means connected to each control arm and arranged to produce equal and opposite pivotal movement upon said control arms.

5. A belt tracking apparatus for use with a belt assembly having a plurality of rollers with supporting shafts for guiding and supporting an endless belt for movement therearound and with the axes of the shafts substantially in parallel comprising a support mechanism having an arm rotatably supporting each end of the shaft of one of the rollers, means for pivotally mounting said support mechanism about an axis substantially normal to the axis of said shaft, said shaft and said pivotal axis defining a plane approximately bisecting the angle between the planes of the belt runs on either side of said roller, *said pivotally mounting means including resilient biasing means associated with said support mechanism for permitting limited movement thereof along said pivotal axis during pivotal movement of said mechanism,* and control means connected to said support mechanism and adapted to produce movement of said arms in opposite directions in response to deviation of the belt from a prearranged belt path whereby said roller is pivoted about an axis in said bisector plane and normal to the axis of said shaft.

6. The apparatus of claim 5 wherein each arm is mounted for pivotal movement on a common axis and, wherein the movement of said arms in opposite directions is a pivotal movement along said common axis.

*7. A flexible material tracking apparatus for use with a system for moving flexible material around three rolling elements with one of the elements being a roller having a shaft therefor arranged to establish a belt run between the same and each of the other two rolling elements comprising*

*a support mechanism having an arm rotatably supporting each end of the shaft of the roller,*

*means for pivotally mounting said support mechanism about an axis substantially normal to the axis of said shaft, said shaft and said pivotal axis defining a plane approximately bisecting the angle defined by the planes of said belt runs,*

*and control means connected to said support mechanism and adapted to produce movement of said arms in opposite directions in response to deviation of the*

*material from a prearranged path of movement whereby said roller is pivoted about an axis in said bisector plane and normal to the axis of said shaft.*

References Cited

The following references, cited by the Examiner, are of record in the patented file of this patent or the original patent.

UNITED STATES PATENTS

| | | | |
|---|---|---|---|
| 2,988,141 | 6/1961 | Madden et al. | 74—241 X |
| 3,156,129 | 11/1964 | Greiner | 74—241 |
| 3,540,571 | 11/1970 | Morse | 198—202 |

FOREIGN PATENTS

| | | | |
|---|---|---|---|
| 719,069 | 10/1965 | Canada | 74—327 |

LEONARD H. GERIN, Primary Examiner